United States Patent [19]
Jax et al.

[11] Patent Number: 5,589,647
[45] Date of Patent: *Dec. 31, 1996

[54] FLEXIBLE SENSOR TUBE AND METHOD FOR DETERMINING A CONCENTRATION CURVE OF A MEDIUM ALONG A PATH WITH THE FLEXIBLE SENSOR TUBE

[75] Inventors: Peter Jax, Erlangen; Klaus Ruthrof, Nürnberg, both of Germany

[73] Assignee: Siemens Aktiengesellschaft, Munich, Germany

[21] Appl. No.: 491,395

Related U.S. Application Data

[63] Continuation of PCT/DE93/01176, Dec. 9, 1993 published as WO94/14043.

[22] Filed: Jun. 19, 1995

[30] Foreign Application Priority Data

Dec. 17, 1992 [DE] Germany ............... 42 42 806.8

[51] Int. Cl.$^6$ ............................................. G01N 37/00
[52] U.S. Cl. .................. 73/863.23; 73/31.07; 73/64.56
[58] Field of Search .............................. 73/40, 40.5 R, 73/40.7, 31.02, 31.03, 31.07, 19.12, 61.41, 61.57, 64.56, 863.23

[56] References Cited

U.S. PATENT DOCUMENTS

| | | | |
|---|---|---|---|
| 3,977,233 | 8/1976 | Issel | 73/40.5 R |
| 4,208,902 | 6/1980 | Kim et al. | 73/31.07 |
| 4,230,463 | 10/1980 | Henis et al. | 427/245 X |
| 4,248,912 | 2/1981 | Gerigk et al. | 427/230 |
| 4,721,517 | 1/1988 | Cloutier | 73/863.23 X |
| 4,735,095 | 4/1988 | Issel | 73/863.33 X |
| 4,857,473 | 8/1989 | Magaritz et al. | 73/61.41 X |
| 5,010,776 | 4/1991 | Lucero et al. | 73/863.23 |
| 5,031,697 | 7/1991 | Wellington et al. | 73/50.5 R X |
| 5,177,996 | 1/1993 | Sahakian | 73/40 |
| 5,215,409 | 6/1993 | Jax et al. | 405/129 |
| 5,259,856 | 11/1993 | Ohga et al. | 65/426 |

FOREIGN PATENT DOCUMENTS

| | | |
|---|---|---|
| 0175219 | 3/1986 | European Pat. Off. . |
| 2277299 | 1/1976 | France . |
| 2431907 | 3/1978 | Germany . |
| 2750874 | 5/1978 | Germany . |
| 3305005 | 8/1984 | Germany . |
| 8427529 | 1/1985 | Germany . |
| 8427528 | 1/1985 | Germany . |
| 3434323 | 3/1986 | Germany . |
| 3434322 | 3/1986 | Germany . |
| 3712809 | 11/1988 | Germany . |
| 4109520 | 9/1992 | Germany . |
| 4134380 | 4/1993 | Germany . |
| 9216316 | 10/1992 | WIPO . |

OTHER PUBLICATIONS

Publication: Oil & Gas Journal, 89, Sep. 9, 1991, No. 36, Tulsa, Oklahoma, (SPERL) pp. 47–52, "System pinpoints leaks on Point Arguello offshore line".

*Primary Examiner*—Thomas P. Noland
*Attorney, Agent, or Firm*—Herbert L. Lerner; Laurence A. Greenberg

[57] ABSTRACT

A flexible sensor tube for determining a concentration curve of a medium along a path includes a flexible tube being formed of a material having good permeability to the medium and having an inner surface being completely provided with a thin coating of a material having poor permeability to the medium. A flexible tube of a material having good permeability to the medium may also be coated on the inner surface with a material being impermeable or having poor permeability to the medium, with a narrow strip extending in the longitudinal direction of the flexible tube being left free. In addition, a band being formed of a material being impermeable or having poor permeability to the medium, can be bent into the shape of a trough, while a slot-like aperture remains free. The slot-like aperture is closed by a strip being formed of a material having good permeability to the medium and extending in the longitudinal direction of the band.

5 Claims, 2 Drawing Sheets

FLEXIBLE SENSOR TUBE AND METHOD FOR DETERMINING A CONCENTRATION CURVE OF A MEDIUM ALONG A PATH WITH THE FLEXIBLE SENSOR TUBE

CROSS-REFERENCE TO RELATED APPLICATION

This application is a Continuation of International Application Ser. No. PCT/DE93/01176, filed Dec. 9, 1993, now international patent application WO 94/14043.

BACKGROUND OF THE INVENTION

1. Field of the Invention:

The invention relates to a flexible sensor tube for determining a concentration curve of a medium along a path. The invention also relates to a method for determining the concentration curve of the medium along the path with a flexible sensor tube of that kind. Such a flexible sensor tube can be used for monitoring pipes, tanks or garbage dumps.

A flexible sensor tube and an apparatus for operating it are known from German Patent DE 24 31 907 C3, corresponding to U.S. Pat. No. 3,977,233. With that flexible sensor tube and apparatus it can be ascertained whether or not a medium is present in the vicinity of the flexible sensor tube. In addition, it is possible to determine a point on the flexible sensor tube where the medium encounters the flexible sensor tube. A concentration curve over the length of the flexible sensor tube can be produced. The flexible tube is permeable to the medium to be detected. A pump is disposed at one end of the flexible tube. With the aid of the pump, individual volumes of a conveying medium can be conveyed through the flexible tube one after the other at intervals of time. A suitable conveying medium is a gas, particularly air. In that way the flow passes through the flexible tube at regular intervals of time, that is to say with a constant frequency, for a conveying period in each case. A sensor being sensitive to the medium to be detected is provided at the other end of the flexible tube. The pump remains switched off between each two conveying periods for a diffusion period, which is distinctly longer than a conveying period. If a medium which is to be detected comes into the vicinity of the flexible tube, it penetrates into the latter within a diffusion period of that kind and is brought to the sensor within a conveying period by the next volume of conveying medium. Since the conveying medium flows at a known speed, the point at which the medium has passed into the flexible tube between two pumping operations can be accurately determined from the difference between the time when the pump is switched on and the time when the sensor responds. In addition, the amount of medium that has penetrated can be determined.

From European Application 0 175 219 A1, corresponding to U.S. Pat. No. 4,735,095, a pipe is known which can be used as a flexible sensor tube in the manner described. That pipe contains a tubular pipe which is impermeable to the medium to be detected and which has individual apertures. That pipe of impermeable material can be surrounded by a pipe of a permeable material. It is also possible for only the apertures in the pipe of impermeable material to be closed by a permeable material. During its conveyance through the pipe the medium which has diffused into the latter from outside can only diffuse out of the pipe again to a very limited extent while it is being conveyed through the pipe, since the inner wall surface of the pipe is for the most part impermeable. The production of a hollow pipe of that kind is very expensive, since the impermeable pipe has to be provided with a number of apertures, particularly bores.

2. Summary of the Invention:

It is accordingly an object of the invention to provide a flexible sensor tube and a method of determining a concentration curve of a medium along a path with the flexible sensor tube, which overcome the hereinafore-mentioned disadvantages of the heretofore-known products and methods of this general type, and in which the flexible sensor tube works reliably in the determination of the concentration curve of the medium along the path and additionally can be produced quickly and in a simple manner.

With the foregoing and other objects in view there is provided, in accordance with the invention, a flexible sensor tube for determining a concentration curve of a medium along a path, comprising a flexible tube being formed of a material having good permeability to a medium and having an inner surface; and a thin coating completely covering the inner surface and being formed of a material having poor permeability to the medium.

The advantage which is thereby achieved is that the medium reaching the flexible sensor tube from the outside always encounters a material which has good permeability and can therefore easily penetrate into the material. From that point an amount of medium sufficient for detection overcomes the thin coating of material having poor permeability and passes into the interior of the flexible sensor tube. From there the medium is practically unable to pass out of the flexible sensor tube through the wall of the latter. That is due to the fact that the thin coating of the material having poor permeability to the medium bounds or borders the interior space of the flexible sensor tube. Due to the relatively fast conveyance of the medium in the flexible sensor tube, the medium has no time to penetrate again into the thin coating to any noteworthy extent. Consequently, it cannot pass to the outside from the flexible tube to any noteworthy extent. It is thereby ensured that the measurements being made are not falsified.

The material having poor permeability absorbs vapor molecules only to a very slight extent. In addition, it has low affinity for nonpolar molecules, which, for example, include hydrocarbons. It is precisely such substances that frequently have to be detected.

The advantage which is therefore achieved is that on its path from the outside into the flexible sensor tube the medium can overcome the thin coating within the diffusion period, whereas from the interior of the flexible sensor tube it can scarcely penetrate into the coating within the conveying period, so that it remains trapped in the flexible sensor tube. Due to the fact that practically no medium which has penetrated into the flexible sensor tube is lost during its conveyance, the concentration curve can be determined very accurately.

In particular, the flexible sensor tube in question achieves the advantage of permitting the tube to be produced quickly and simply, since no apertures have to be formed in it.

The coating of the flexible sensor tube can be effected by processes of precipitation from a gas phase, lacquering processes or immersion processes. It is also possible to insert an inner flexible tube, which is subsequently pressed against the inner surface by expansion of the inner tube.

In accordance with another feature of the invention, the thickness of the coating of material having poor permeability amounts, for example, to between 100 μm and 800 μm. Such a thin coating is not a significant obstacle for a large amount of the medium which has penetrated into the relatively thick wall of the flexible sensor tube of the material having good permeability. Nevertheless, it prevents the penetration of the medium from the inside into the wall of the flexible sensor tube.

With the objects of the invention in view, there is also provided a flexible sensor tube for determining a concentration curve of a medium along a path, comprising a flexible tube being formed of a material having good permeability to a medium and having an inner surface and a longitudinal direction; and another material coating the inner surface and being poorly permeable or impermeable to the medium, defining a narrow strip extending in the longitudinal direction of the flexible tube and being left free of the other material.

The advantage which is thereby gained is that at the uncoated strip a particularly large amount of medium can pass from the outside into the flexible sensor tube. That is assisted by the fact that in the material having good permeability the medium can pass to the strip having particularly good permeability, even if it should have penetrated at a different point. However, the medium which has arrived in the flexible sensor tube can scarcely leave the latter, because the strip having good permeability is very small in comparison with the entire inner surface of the flexible sensor tube. Even less medium can leave the flexible sensor tube again if, instead of being of material having poor permeability, the coating is formed of impermeable material. Only the free strip is then available.

In accordance with a further feature of the invention, the strip has, for example, a width of 0.1 mm to 2 mm. With such a narrow strip the advantage which is gained is that almost no medium can leave the flexible tube again.

In accordance with an added feature of the invention, while leaving the strip free, the flexible tube is, for example, coated with a coating of a thickness between 1 mm and 5 mm. That coating contributes toward the mechanical stability of the flexible sensor tube.

The flexible tubes of the first and second embodiments can, for example, have a circular or polygonal, for example rectangular, cross-section.

With the objects of the invention in view, there is additionally provided a flexible sensor tube for determining a concentration curve of a medium along a path, comprising a band being formed of a material being poorly permeable or impermeable to a medium, being bent into the shape of a trough, having a slot-like aperture being left free therein and having a longitudinal direction; and a strip closing the slot-like aperture, extending in the longitudinal direction of the band and being formed of a material having good permeability to the medium.

In this embodiment also the penetrated medium is to a large extent trapped in the flexible sensor tube.

In accordance with an additional feature of the invention, the slot-like aperture has, for example, a width between 0.1 mm and 2 mm. In accordance with yet another feature of the invention, the band may, for example, be 1 mm to 5 mm in thickness. The mechanical stability of the flexible sensor tube is thereby ensured.

The band being bent into the shape of a trough or a channel may, for example, have a circular or polygonal cross-section.

All of the flexible sensor tubes according to the invention are in particular distinguished by the fact that they can be produced quickly in a simple manner. Complete coating and also coating with a strip being left free can easily be achieved. A flexible sensor tube having a strip being formed of a different material than the remainder of the tube is also easy to produce.

If the flexible sensor tube has a polygonal cross-section with two surfaces being parallel to one another, it can be inserted particularly well into a space which is to be monitored and which is bounded by two parallel seals, for example sheets. The parallel surfaces of the flexible sensor tube in that case can lie against the seals, so that the flexible sensor tube serves as a spacer between the seals.

Seals of that kind may be component parts of a device which is known from German Published, Non-Prosecuted Application DE 41 09 520 A1, corresponding to U.S. Pat. No. 5,215,409, for sealing and monitoring a volume, which may be a garbage dump.

In accordance with yet a further feature of the invention, the material having good permeability to the medium may, for example, be ethylene vinyl acetate (EVA).

In accordance with yet an added feature of the invention, the material having poor permeability to the medium is polyvinyl chloride (PVC).

With the objects of the invention in view, there is additionally provided a method for determining a concentration curve of a medium along a path with a flexible sensor tube, which comprises feeding a conveying medium into the beginning of the flexible sensor tube at intervals of time; and monitoring the conveying medium arriving at the end of the flexible sensor tube for an admixture of the medium to be detected.

Reliable determination of the concentration curve is possible through the use of one of the variants of the flexible sensor tube.

The flexible sensor tube according to the invention in particular gains the advantage of permitting the flexible sensor tube to be produced quickly and simply. The first and second variants are formed of a homogeneous, internally coated flexible tube which is simple to produce. The third variant, which has an insert of a different material in the longitudinal direction, is also easy to produce. For that purpose only one band has to be bent into the shape of a trough or a C-shape, whereupon the remaining gap is closed with the other material.

Other features which are considered as characteristic for the invention are set forth in the appended claims.

Although the invention is illustrated and described herein as embodied in a flexible sensor tube and a method of determining a concentration curve of a medium along a path with the flexible sensor tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
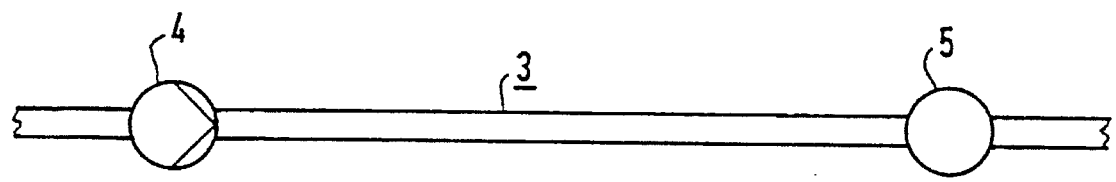
FIG. 1 is a fragmentary, diagrammatic, elevational view of a flexible sensor tube in conjunction with a pump and a sensor for determining a concentration curve of a medium along a path.

Referring now to the figures of the drawing in detail and first, particularly, to FIGS. 2 to 6 thereof, there is seen a flexible sensor tube 3a, 3b, 3c, 3d, 13 with which a concentration curve of a medium, for example a hydrocarbon, along the flexible sensor tube 3a, 3b, 3c, 3d, 13 can be determined by a known leakage detection and location method. To that end, as is shown in FIG. 1, at the beginning of a flexible sensor tube 3 there is disposed a pump 4, from which volumes of air are delivered at intervals through the flexible sensor tube 3. In each case the pump 4 is switched on for a relatively short conveying period and then switched off for a relatively long diffusion period. The medium can penetrate from outside into the flexible sensor tube 3. During the diffusion period a concentration curve with a local concentration maximum of the medium can build up in the flexible sensor tube 3. In the next conveying period the concentration maximum is fed to and detected by a suitable sensor 5 disposed at the end of the flexible sensor tube 3. If the penetrated medium is detected by the sensor 5 in a particular air volume, the position in the flexible sensor tube 3 where the medium has penetrated in the latter can be determined. The determination is performed with the aid of the known speed of flow of the air volume in the flexible sensor tube 3 and from the time elapsing between the commencement of the conveying period and the moment at which the concentration maximum of the medium arrived at the sensor 5. Any of the flexible sensor tubes 3a–3d or 13 shown in FIGS. 2 to 6 can, for example, take the place of the flexible sensor tube 3 in FIG. 1.

Figure 2:
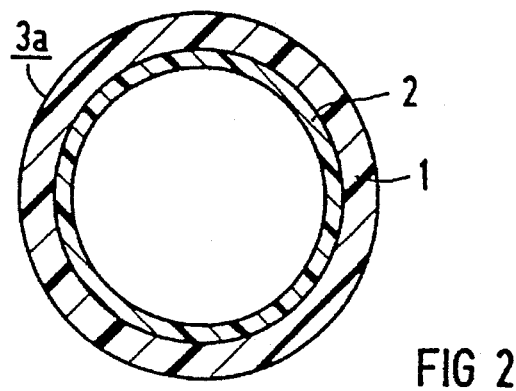
FIG. 2 is a cross-sectional view of a flexible sensor tube which is completely coated internally with a material having poor permeability.

The flexible sensor tube 3a shown in FIG. 2 is formed of a flexible tube 1 being made of a material which has good permeability to the medium having a concentration curve along the flexible sensor tube 3a which is to be determined. The flexible tube 1 is provided internally with a thin coating 2 being formed of a material having poor permeability to the medium. The thickness of the thin coating 2 may be between 100 μm and 800 μm. The material having good permeability may be ethylene vinyl acetate (EVA) and the material having poor permeability may be polyvinyl chloride (PVC). A medium encountering the flexible sensor tube according to FIG. 2 from the outside quickly penetrates into the permeable flexible tube 1 and then also passes through the relatively thin coating 2. However, the medium from the interior of the flexible sensor tube 3a is practically not absorbed by the walls of the flexible tube, since there it first encounters the thin coating 2 of the material having poor permeability and in addition is moved in the interior of the flexible sensor tube 3a. Due to the thin coating 2, medium which has penetrated is trapped in the flexible sensor tube 3a as it is conveyed. No noteworthy part of the medium passes out of the flexible sensor tube 3a, nor is any noteworthy part of the medium absorbed in the wall of the flexible tube. This is due to the fact that the thin coating 2 has low permeability to the medium and in addition scarcely absorbs vapor molecules which could originate from the medium.

The flexible sensor tube 3a according to FIG. 2 can be produced simply. A process of precipitation from a gas phase, a lacquering process or an immersion process are, for example, suitable for the application of the thin coating 2 to the inner wall surface of the flexible tube 1. It is also possible to insert an inner flexible tube of sheet material, which is then pressed by pressure from the inside against the inner surface of the flexible tube 1.

Figure 3:
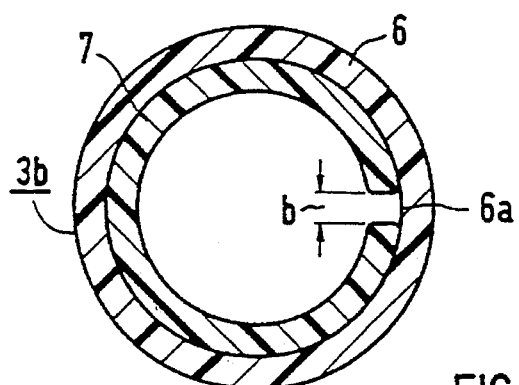
FIG. 3 is a view similar to FIG. 2 of a flexible sensor tube which, except for a strip extending in the longitudinal direction, is coated internally with a material that is impermeable or has poor permeability.

According to FIG. 3, in another embodiment of the flexible sensor tube 3b, a flexible tube 6 is provided which is formed of a material having good permeability to the medium. The flexible tube 6 is provided on its inner surface with a coating 7 of a material which is impermeable or has poor permeability, while a strip 6a of the inner surface of the flexible tube 6 is left free. In this case the strip 6a extends in the longitudinal direction over the entire length of the flexible tube 6. The coating 7 can have a thickness which ensures the mechanical stability of the flexible sensor tube 3b according to FIG. 3. A medium reaching the flexible sensor tube 3b according to FIG. 3 from outside easily penetrates into the flexible tube 6 and inside the material of the flexible tube 6, it reaches the uncoated strip 6a. The medium there passes into the interior of the flexible sensor tube 3b. It is impossible for any noteworthy amount of the trapped medium to again pass out of the flexible sensor tube 3b through the wall of the latter, because the relatively thick coating 7 neither allows the passage of the medium nor absorbs it. The probability that noteworthy parts of the medium will come from the inside to reach the uncoated strip 6a, which is narrow, is very slight. The coating 7 can have a thickness between 1 mm and 5 mm. The coating 7 consequently assists or ensures the mechanical stability of the flexible sensor tube 3b. A width b of the uncoated strip 6a amounts, for example, to between 0.1 mm and 2 mm. It is thereby ensured that very little material can pass outward from the interior of the flexible sensor tube 3b. The coating 7 can be applied to the flexible tube 6 in the same way as the coating 2 is applied to the flexible tube 1 in FIG. 2. However, the relatively great thickness of the coating 7 also makes it possible for the coating 7 to first be produced as a body and for the flexible tube 6 to then be fitted onto this body including the coating 7. This can, for example, be done by extrusion.

Figure 4:
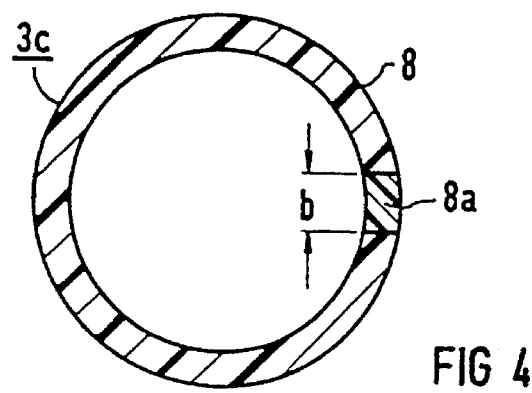
FIG. 4 is another view similar to FIG. 2 of a flexible sensor tube which, except for a strip extending in the longitudinal direction of the flexible sensor tube and being formed of a material having good permeability, consists of a material that is impermeable or has poor permeability.

According to FIG. 4 another variant of the flexible sensor tube 3c is composed of a band 8 which is bent into the shape of a trough or a channel or a C-shape and which is formed of a material being impermeable or having poor permeability to the medium. A slot-like aperture extending in the longitudinal direction of the bent band 8 is closed by a strip 8a which has a width b and which is formed of a material having good permeability to the medium. In this embodiment the medium passes from outside through the strip 8a into the interior of the flexible sensor tube 3c. Since as a rule a very large amount of the medium will be present outside the flexible sensor tube 3c and an adequate diffusion period is provided, an amount sufficient for the determination of the concentration curve passes into the interior of the flexible sensor tube 3c. The medium there almost exclusively encounters the impermeable material of the bent band 8, so that it cannot pass out of the flexible sensor tube 3c within a comparatively short conveying period. A suitable width b of the slot-like aperture is between 0.1 mm and 2 mm, as in the case of the strip 6a according to FIG. 3. In order to ensure adequate mechanical stability the bent band 8 has, for example, a thickness between 1 mm and 5 mm.

Figure 5:
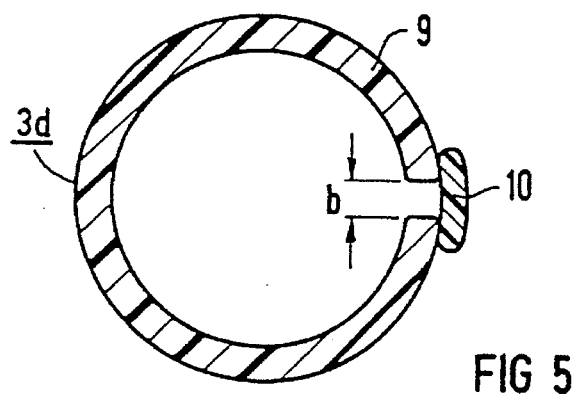
FIG. 5 is a view similar to FIG. 3 of a variant of the embodiment according to FIG. 3.

The flexible sensor tube 3d according to FIG. 5 largely corresponds to the flexible sensor tube 3c according to FIG. 4. The flexible sensor tube 3d according to FIG. 5 is also formed from a band 9 which is bent into the shape of a trough and is made of material that is impermeable or has poor permeability. The aperture which is left and has a width b, is closed by a strip 10 of permeable material. In order to simplify production, the strip 10 is not fitted into the aperture as in the case of the strip 8a in FIG. 4. On the contrary, it covers the aperture. As in the embodiment according to FIG. 4, the band 9 can have a thickness between 1 mm and 5 mm. The slot-like aperture which initially remains can, for example, have a width b between 0.1 mm and 2 mm after the band 9 has been bent into the shape of a trough.

As is illustrated in FIGS. 2 to 5, the flexible sensor tube 3 can have a circular cross-section.

Figure 6:
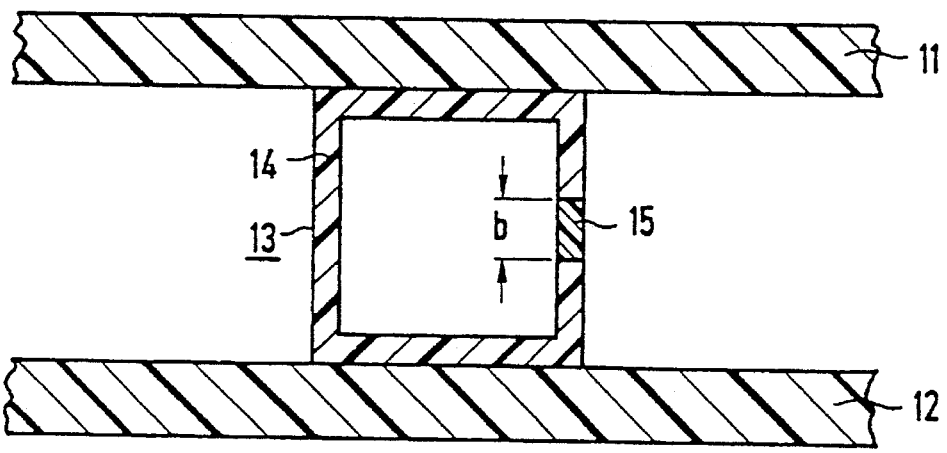
FIG. 6 is a fragmentary, sectional view of a variant of the embodiment according to FIG. 4, having a polygonal cross-section and being disposed in a double seal.

However, in accordance with FIG. 6 it may also have a polygonal and particularly a rectangular or square cross-section. In this case the flexible sensor tube 13 may have upper and lower surfaces which are parallel to one another and which, in the case of a utilization inside a double seal, can lie against two seals 11, 12 of the double seal, which may be sheets. A flexible sensor tube 13 of this kind in this case serves as a support in the double seal. The double seal together with the flexible sensor tube 13 in this case can be a component part of a device for sealing and monitoring a garbage dump in accordance with German Published, Non-Prosecuted Application DE 41 09 520 A1, corresponding to U.S. Pat. No. 5,215,409.

The polygonal flexible sensor tube 13 illustrated in FIG. 6 is formed of a band 14 which is bent into the shape of a trough and is made of material that is impermeable or has poor permeability. An aperture which is left is closed by a strip 15 of permeable material that has a width b.

The flexible sensor tube 13 thus largely corresponds to the flexible sensor tube 3c according to FIG. 4. However, the variants of the flexible sensor tubes 3a, 3b or 3d in accordance with FIGS. 2, 3 or 5 may also be given a polygonal shape, as is illustrated in FIG. 6.

The flexible sensor tubes 3a, 3b, 3c, 3d, 13 of FIGS. 2 to 6 are particularly suitable for determining the concentration curve of a medium along a path with an apparatus according to FIG. 1, since although they receive the medium, they nevertheless only absorb or allow the escape of the trapped medium to a slight extent. In particular, the flexible sensor tubes 3a, 3b, 3c, 3d, 13 according to FIGS. 2 to 6 can be produced quickly, reliably and simply.

We claim:

1. A sensor assembly, comprising:

a sensor and a flexible tube communicating with said sensor and extending along a given path for determining a concentration curve of a medium along the given path, said flexible tube being formed of a material having relatively good permeability to the medium and having an inner surface; and a thin coating completely covering said inner surface and being formed of a material having relatively poor permeability to the medium.

2. The sensor assembly according to claim 1, wherein said thin coating has a thickness of between 100 μm and 800 μm.

3. The sensor assembly according to claim 1, wherein said material having good permeability to the medium is ethylene vinyl acetate.

4. The sensor assembly according to claim 1, wherein said material having poor permeability to the medium is polyvinyl chloride.

5. A method for determining a concentration curve of a medium along a path with a sensor assembly including a sensor and a flexible sensor tube having a beginning, an end communicating with the sensor, the flexible tube being formed of a material with relatively good permeability to a medium and with an inner surface, and a thin coating completely covering the inner surface and being formed of a material with relatively poor permeability to the medium, which comprises:

feeding a conveying medium into the beginning of the flexible sensor tube at intervals of time; and monitoring the conveying medium arriving at the sensor adjacent the end of the flexible sensor tube for an admixture of the medium to be detected.

\* \* \* \* \*